United States Patent
Iwabuchi

(10) Patent No.: US 9,321,698 B2
(45) Date of Patent: *Apr. 26, 2016

(54) METHOD FOR TREATING ORGANIC WASTE AND METHOD OF UTILIZING HEAT ENERGY

(75) Inventor: Kazunori Iwabuchi, Utsunomiya (JP)

(73) Assignee: Katsumori Taniguro, Nasushiobara-shi, Tochigi (JP)

( * ) Notice: Subject to any disclaimer, the term of this patent is extended or adjusted under 35 U.S.C. 154(b) by 1117 days.

This patent is subject to a terminal disclaimer.

(21) Appl. No.: 12/936,064

(22) PCT Filed: Mar. 25, 2009

(86) PCT No.: PCT/JP2009/055938
§ 371 (c)(1),
(2), (4) Date: Oct. 1, 2010

(87) PCT Pub. No.: WO2009/125670
PCT Pub. Date: Oct. 15, 2009

(65) Prior Publication Data
US 2011/0021862 A1    Jan. 27, 2011

(30) Foreign Application Priority Data

Apr. 8, 2008 (JP) .................. 2008-099985

(51) Int. Cl.
*C05F 17/00* (2006.01)
*C05F 17/02* (2006.01)
(Continued)

(52) U.S. Cl.
CPC ......... *C05F 17/0018* (2013.01); *C05F 17/0072* (2013.01); *C05F 17/027* (2013.01);
(Continued)

(58) Field of Classification Search
CPC .. C02F 11/02; C05F 17/0018; C05F 17/0072; C05F 17/027; C10L 2290/145; C10L 2290/26; C10L 2290/60; C10L 5/42; C10L 5/442; C10L 5/445; C10L 9/08; Y02E 50/10; Y02E 50/30
USPC .............. 435/262, 289.1, 290.1, 290.2, 290.3
See application file for complete search history.

(56) References Cited

U.S. PATENT DOCUMENTS 4,135,908 A    1/1979  Widmer
4,291,636 A    9/1981  Bergsten et al.
(Continued)

FOREIGN PATENT DOCUMENTS

CN    1917941    2/2007
EP    0463546    1/1992
(Continued)

OTHER PUBLICATIONS

Hellebrand et al., "Carbon monoxide from composting due to thermal oxidation of biomass", Journal of Environmental Quality, American Society of Agronomy, Crop Science Society of America and Soil Science of America, US, vol. 37, No. 2, Jan. 1, 2008, pp. 592-598.
(Continued)

*Primary Examiner* — Michael Marcheschi
*Assistant Examiner* — Shanta G Doe
(74) *Attorney, Agent, or Firm* — Drinker Biddle & Reath LLP

(57) ABSTRACT

The method is for reaction treatment including: an organic waste in which oxygen is difficult to penetrate and in which a biochemical reaction by microbe is difficult to occur. This method includes: forcedly supplying oxygen to inner parts of the organic waste to elevate, by biochemical reactions, the temperature of the inner parts of the organic waste to which oxygen has been supplied; and maintaining the elevated temperature to continue the biochemical reactions and thereby compost the organic waste. Thereafter, the organic waste which has been composted is held in the presence of oxygen and carbon monoxide to cause an exothermic reaction and thereby reduce the volume of the organic waste or carbonize the waste.

2 Claims, 8 Drawing Sheets

(51) Int. Cl.
  *C10L 5/42*   (2006.01)
  *C10L 5/44*   (2006.01)
  *C10L 9/08*   (2006.01)
  *C02F 11/02*   (2006.01)

(52) U.S. Cl.
  CPC   *C10L 5/42* (2013.01); *C10L 5/442* (2013.01);
    *C10L 5/445* (2013.01); *C10L 9/08* (2013.01);
    *C02F 11/02* (2013.01); *C10L 2290/145*
    (2013.01); *C10L 2290/26* (2013.01); *C10L*
    *2290/60* (2013.01); *Y02E 50/10* (2013.01);
    *Y02E 50/30* (2013.01); *Y02P 20/136* (2015.11);
    *Y02P 20/145* (2015.11); *Y02W 30/43* (2015.05)

(56) References Cited

U.S. PATENT DOCUMENTS

| | | | |
|---|---|---|---|
| 4,333,757 A * | 6/1982 | Kurtzman, Jr. | 71/5 |
| 4,364,745 A | 12/1982 | Weil | |
| 5,338,442 A | 8/1994 | Siskin et al. | |
| 6,699,708 B1 * | 3/2004 | Muller et al. | 435/262 |
| 8,361,186 B1 | 1/2013 | Shearer et al. | |
| 8,500,829 B2 | 8/2013 | Siskin et al. | |
| 2002/0040864 A1 | 4/2002 | Serio et al. | |
| 2004/0016274 A1* | 1/2004 | Rudas | 71/9 |
| 2005/0108928 A1 | 5/2005 | Sparks | |
| 2007/0160524 A1 | 7/2007 | Yoshida | |
| 2008/0072478 A1 | 3/2008 | Cooper | |
| 2010/0112242 A1 | 5/2010 | Medoff | |

FOREIGN PATENT DOCUMENTS

| | | |
|---|---|---|
| EP | 1 854 775 A1 | 11/2007 |
| EP | 2275394 | 1/2011 |
| JP | 01-310799 | 12/1989 |
| JP | 8-283086 | 10/1996 |
| JP | H10-183135 | 7/1998 |
| JP | 2000-046472 | 2/2000 |
| JP | 2000-297917 | 10/2000 |
| JP | 2001-137806 | 5/2001 |
| JP | 2003171195 | 6/2003 |
| JP | 2003-200139 | 7/2003 |
| JP | 2004-313858 | 11/2004 |
| JP | 2005/077514 | 8/2005 |
| JP | 2006-055761 | 3/2006 |
| JP | 2006-198566 | 8/2006 |
| JP | 2008-253875 | 10/2008 |
| JP | 2009-249240 | 10/2009 |
| WO | WO 01/10796 A1 | 2/2001 |
| WO | WO 02/34694 A1 | 5/2002 |
| WO | WO 2004/029001 A1 | 4/2004 |
| WO | WO 2005/063946 A1 | 7/2005 |
| WO | 2009/125670 | 10/2009 |

OTHER PUBLICATIONS

Schade et al., "CO emissions from degrading plant matter", Tellus B., vol. 51, No. 5, Nov. 1, 1999, pp. 889-908.

U.S. Office Action dated Nov. 28, 2014 that issued in U.S. Appl. No. 13/500,020 including Double Patenting Rejections on pp. 9-11.

* cited by examiner

METHOD FOR TREATING ORGANIC WASTE AND METHOD OF UTILIZING HEAT ENERGY

FIELD OF THE INVENTION

This invention relates to a method and an apparatus for reaction treatment of an organic waste. In particular, this invention relates to a method and an apparatus for reaction treatment of an organic waste to allow oxygen to be easily introduced inside the organic waste in which the oxygen is difficult to penetrate when organic waste is left out and thereby a biochemical reaction by microbe is difficult, and to achieve composting, volume reduction and the like by self-heating. Further, this invention relates to a method of utilizing the self-heating generated by the method for reaction treatment of the organic waste as a source of heat.

BACKGROUND ART

With increase in recognition of recycling usage of biological resources, a lot of kinds of organic wastes have recently been composted and reduced to the earth as resource. Food wastes, such as livestock excreta (wastes) and food scraps (hereinafter these are collectively referred to as "livestock excreta (wastes) and the like"), which are the livestock excreta (wastes) that is most expected to be composted and/or resourced, often has high moisture, or so-called in a quagmire state, at the time of generation. For such livestock excreta (wastes) and the like, there are difficulties, such as that oxygen is hardly introduced inside the livestock excreta (wastes) and the like because of the quagmire state, that the biochemical reaction by the ordinary microbial degradation is difficult to occur, and that the livestock excreta (wastes) and the like are difficult to be composted. As a result, conventionally, a method that reduces a water content ratio in order to take in the oxygen inside the livestock excreta (wastes) has been adapted.

As one of the means to reduce the water content ratio, there is a method to provide heat energy, aeration and the like to the organic waste. However, such a method is not realistic due to an issue of the cost. In addition, as another means, in the case of the livestock excreta (wastes), for example, there is a method to mix agricultural by-products, such as sawdust, rice straws, rice husk and the like, with the organic waste. This method reduces the moisture contained in the organic waste and, as a result, to ease the airflow to promote the biochemical reaction by microbial degradation. However, the agricultural by-products may be difficult to procure in some regions, or the cost for procuring the agricultural by-products may increase. Moreover, even when the agricultural by-products can be obtained, the cost may further increase due to the additional processing of the agricultural by-products. Furthermore, in this method, there is a difficulty that the mixture of such agricultural by-products causes an increase in costs as the total amount of treatment increases.

Below Patent Document 1 proposes a method for the wastes recycling by heating and stirring the livestock excreta (wastes) and the like in a container to compost the waste. However, in this method also, the water content ratio needs to be reduced by providing the heat energy and the like, similar to those discussed above, to the organic waste having a high water content ratio, and thus, there is still an issue in terms of the cost.

PRIOR ART DOCUMENT

[Patent Document] Japanese Laid-Open Patent Application No. 2003-171195

On the other hand, it has been considered to reduce the volume of the organic waste and return to soil without composting and resourcing the organic waste. However, even in that case, the water content ratio must be decreased for the organic waste in the quagmire state. This results in the problem similar to the above. Moreover, if the water content ratio of the organic waste in the quagmire state is simply lowered and dried, the reaction for composting the waste by the microbial degradation does not occur. Therefore, the dried organic waste would return to the original organic waste in the quagmire state if returned to soil. Moreover, in this method, cost for sewage process similar to those for human excreta cannot be incurred.

DISCLOSURE OF THE INVENTION

Problems Solved by the Invention

This invention is provided to resolve the above-discussed problems. An object of the invention is to provide a method and an apparatus for reaction treatment of the organic waste that effectively achieve the composting, and reduction of the volume of, the organic waste having a high water content ratio, by accelerating the microbial degradation, without drying the organic waste by the conventional heat energy or aeration, or by mixing the agricultural by-products, such as sawdust.

Moreover, another object of the invention is to provide a method of effectively utilizing the heat generated by such method and apparatus for reaction treatment of the organic waste.

Problem Resolution Means

In the process of researching methods and apparatus for effectively reaction treatment of the organic waste having a high water content that allows composting and reusing the organic waste or treating the organic waste by reducing the volume of the organic waste, the inventor of this application discovered that the composting of the organic waste can be realized by accelerating the biochemical reaction by microbial degradation if oxygen is effectively supplied to the organic waste, even when the organic waste is in the quagmire state with a high water content ratio. With further researches, the inventor discovered that the temperature of the organic waste surprisingly increases to 100° C. and further to 200° C., which exceeded the temperature at which the self-heating by the microbial degradation (around approximately 70° C.) ends. It was also discovered that a similar temperature increase occurs when the organic waste with a low water content ratio is placed under a specific atmosphere. These discoveries were obtained based on the knowledge of the inventor, and the inventions relating to the below first to third aspects are proposed.

That is, the method for reaction treatment of the organic waste according to the first aspect of the invention to solve the above-discussed problems is to achieve the composting and resourcing the organic waste particularly in the quagmire state. The point is that a method for reaction treatment of an organic waste, in which oxygen is difficult to penetrate and in which a biochemical reaction by microbe is difficult to occur when organic waste is left out, comprises: forcedly supplying the oxygen inside the organic waste; increasing an internal temperature of the organic waste into which the oxygen is supplied, by the biochemical reaction; and maintaining the increased temperature to continue the biochemical reaction and to compost the organic waste.

According to this invention, even when organic waste is in the quagmire state, in which oxygen is difficult to penetrate while the organic waste is left out, and in which biochemical reactions by microbe are difficult to occur, the biochemical reaction of the organic waste can be accelerated and continued by forcedly supplying the oxygen inside the organic waste. Therefore, the composting and resourcing of the organic waste can be realized. Such a reaction treatment method is different from the conventional techniques that dry the organic waste by heating or blowing air, or that mix agricultural by-products, such as sawdust. This reaction treatment method allows the organic waste having a high water content ratio to accelerate the microbial degradation and to reduce its volume by drying up.

The method for reaction treatment of the organic waste according to the second aspect of this invention to solve the above-discussed problems achieves the volume reduction and disposal of the organic waste particularly in a quagmire state. The point is that a method for reaction treatment of an organic waste, in which oxygen is difficult to penetrate and in which a biochemical reaction by microbe is difficult to occur when organic waste is left out, comprises: a first reaction stage that forcedly supplies the oxygen inside the organic waste, increases an internal temperature of the organic waste into which the oxygen is supplied, by the biochemical reaction, and maintains the increased temperature to continue the biochemical reaction and to compost the organic waste; and a second reaction stage that causes an exothermic reaction by placing the organic waste after the first reaction stage in the presence of oxygen and carbon monoxide and reduces a volume of the organic waste and/or carbonizes the organic waste.

According to this invention, as a second reaction stage after the first reaction stage, which is the reaction treatment method according to the first aspect, the temperature can be surprisingly increased over the temperature (around approximately 70° C.) at which the self-heating ends and to 100° C. and 200° C., by placing the organic waste in the presence of oxygen and carbon monoxide and causing a chemical reaction. As a result, the organic waste can be sufficiently composted, and the volume of the organic waste can be reduced by drying. Further, by the further increase of temperature, the organic waste can be carbonized, and the volume reduction can be achieved at low cost. According to the reaction treatment method of the second aspect, because the organic waste can be dried and carbonized while being sufficiently composted, the organic waste does not return to the original quagmire state, as conventionally done, even when it is disposed in soil again.

In the method for reaction treatment of the organic waste according to the first and second aspects of the invention, the organic waste, in which the oxygen is difficult to penetrate and in which the biochemical reaction by microbe is difficult to occur, when the organic waste is left out, is livestock excreta (wastes) or agricultural waste product, which entirely or locally have water content ratio of 80% or greater, or a food waste product, which entirely or locally have water content ratio of 40% or greater.

The phrase "the organic waste, in which the oxygen is difficult to penetrate when the organic waste is left out and in which the biochemical reaction by microbe is difficult to occur" indicates an organic waste that has become in a quagmire state so that air permeability is low. More specifically, when the organic waste is livestock excreta (wastes) or an agricultural waste product, its water content ratio is entirely 80% or greater, or locally 80% or greater although its entire water content ratio is not as high. When the organic waste is a food waste product, such as food scraps, its water content ratio is entirely 40% or greater, or locally 40% or greater although its entire water content ratio is not as high. These organic wastes are entirely or locally in a quagmire state, in which the oxygen is difficult to penetrate when the organic waste is left out and in which the biochemical reaction by microbe is difficult to occur. According to this invention, by applying the reaction treatment method of the first and second aspects, the biochemical reaction by microbial degradation is accelerated in such organic wastes.

In the method for reaction treatment of the organic waste according to the first and second aspects of the invention, forced oxygen supply inside the organic waste is performed by placing the organic waste under a slightly high pressure of air including the oxygen or by directly injecting the oxygen inside the organic waste.

Because oxygen can be forcedly supplied inside the organic waste by the specific means of this invention, the biochemical reaction by microbial degradation can be accelerated.

In the method for reaction treatment of the organic waste according to the first and second aspects of the invention, a pressure of the slightly high pressure is greater than an atmospheric pressure and equal to or below 15 MPa.

According to this invention, in the above-described pressure range, the oxygen can be forcedly supplied in the organic waste. Therefore, the composting of the organic waste can be achieved without using an expensive pressure container or the like.

In the method for reaction treatment of the organic waste according to the second aspects of the invention, the second reaction stage is performed under a condition in which a temperature of the organic waste is at least equal to or greater than 55° C., the carbon monoxide is originated from the organic waste after the first reaction stage, and concentration of the carbon monoxide is equal to or greater than 50 ppm.

According to this invention, the second reaction stage can be easily and efficiently progressed in an environment in which the temperature of the organic waste is at least equal to or greater than 55° C., and in which the concentration of carbon monoxide generated from the organic waster after the first reaction stage is equal to or greater than 50 ppm. As a result, the temperature can be increased above the temperature (around approximately 70° C.) at which the self-heating by microbial degradation ends and to a high temperature, such as 100° C. and 200° C.

The method for reaction treatment of the organic waste according to the third aspect of the invention to solve the above-described problems achieves the volume reduction and reaction treatment of the organic waste that is particularly not limited to one in quagmire state. The method for reaction treatment of an organic waste, comprises: causing an exothermic reaction by placing the organic waste, in which the exothermic reaction occurs by being held in the presence of oxygen and carbon monoxide, in an environment where a temperature of the organic waste is at least equal to or greater than 55° C. and a concentration of the carbon monoxide is equal to or greater than 50 ppm; and reducing a volume of the organic waste or carbonizing the organic.

According to this invention, by placing the organic waste, in which an exothermic reaction takes place in the presence of oxygen and carbon monoxide, under the above-discussed temperature and concentration of the carbon monoxide gas, the exothermic reaction can be surprisingly remarkably accelerated, and the temperature can be increased to 100° C. or 200° C. As a result, the organic waste can be sufficiently dried, and the volume of the organic waste can be reduced. Further, by the further increase of temperature, the organic waste can be carbonized, and the volume reduction can be achieved at low cost. According to the reaction treatment method of the third aspect, because the organic waste can be dried or carbonized, the organic waste does not return to the original quagmire state, as conventionally done, even when it is disposed in soil again.

In the method for reaction treatment of the organic waste according to the third aspect of this invention, the carbon monoxide is originated from the organic waste.

According to this invention, it is preferable that the carbon monoxide is generated, similar to that generated in the organic waste in which the heat is generated due to the biochemical reaction by microbial degradation.

The apparatus for reaction treatment of the organic waste of this invention to solve the above-discussed problems, has a sealable container into and from which the organic waste is placed and removed; and a pressure controlling device that controls a pressure inside the container over an atmospheric pressure and equal to or less than 15 MPa.

According to this invention, the reaction treatment apparatus includes a sealable container and a pressure controlling device. Therefore, by placing in the container an organic waste, in which the oxygen is difficult to penetrate when the organic waste is left out and in which the biochemical reaction by microbe is difficult to occur, and by pressurizing the container in the above-discussed range after sealing the container, the oxygen can be forcedly supplied in the organic waste. As a result, the biochemical reaction by microbial degradation occurs in the organic waste, and the composting and drying, for example, of the organic waste can be accelerated. Because the controlled pressure is not extremely high, it is not necessary to use an expensive pressure container. Therefore, the reaction treatment apparatus of this invention can achieve the method for reaction treatment of the organic waste according to the above-discussed first to third aspect easily and at low cost.

The apparatus for reaction treatment of the organic waste of this invention has the container including a concentration meter for carbon monoxide and thermometer.

A method for utilizing heat energy to solve the above-discussed problems, utilizes heat generated from performing the second reaction stage of the method for reaction treatment of the organic waste or utilizes heat generated from performing the method for reaction treatment of the organic waste.

Advantageous Effect of the Invention

According to this invention, even when organic waste is in the quagmire state, in which oxygen is difficult to penetrate while the organic waste is left out, and in which biochemical reactions by microbe are difficult to occur, the biochemical reaction of the organic waste can be accelerated and continued by forcefully supplying the oxygen inside the organic waste. Therefore, the composting and resourcing of the organic waste can be realized. Such a reaction treatment method is different from the conventional techniques that dry the organic waste by heating or blowing air, or that mix agricultural by-products, such as sawdust. This reaction treatment method allows the organic waste having a high water content ratio to accelerate the microbial degradation and to reduce its volume by drying up.

According to this invention, as a second reaction stage after the first reaction stage, which is the reaction treatment method according to the first aspect, by placing the organic waste in the presence of oxygen and carbon monoxide and causing a chemical reaction, the temperature can be surprisingly increased above the temperature (around approximately 70° C.) at which the self-heating ends and to 100° C. and 200° C. As a result, the organic waste can be sufficiently composted, and the volume of the organic waste can be reduced by drying. Further, by the further increase of temperature, the organic waste can be carbonized, and the volume reduction can be achieved at low cost.

According to this invention, by placing the organic wastes, in which an exothermic reaction takes place in the presence of oxygen and carbon monoxide, under the above-discussed temperature and concentration of the carbon monoxide gas, the exothermic reaction can be surprisingly remarkably accelerated, and the temperature can be increased to 100° C. or 200° C. As a result, the organic waste can be sufficiently dried, and the volume of the organic waste can be reduced. Further, by the further increase of temperature, the organic waste can be carbonized, and the volume reduction can be achieved at low cost.

According to this invention, the reaction treatment apparatus includes a sealable container and a pressure controlling device. Therefore, by placing in the container an organic waste, in which the oxygen is difficult to penetrate when the organic waste is left out and in which the biochemical reaction by microbe is difficult to occur, and by pressurizing the container in the above-discussed range after sealing the container, the oxygen can be forcedly supplied in the organic waste. As a result, the biochemical reaction by microbial degradation occurs in the organic waste, and the composting and drying, for example, of the organic waste can be accelerated. Because the controlled pressure is not extremely high, it is not necessary to use an expensive pressure container.

According to the method for utilizing heat energy of this invention, the heat generated in the method for reaction treatment of the organic waste according to this invention is utilized as a heat source. Therefore, the heat energy can be effectively used. In particular, by utilizing the heat energy as an energy source for livestock raising business and the like, the business cost can be saved, thereby increasing competition.

BEST MODE TO IMPLEMENT THE INVENTION

The invention is explained in detail based on embodiments below. The below embodiments are preferable examples of the invention, and the construction of the invention is not limited to the embodiments.

FIG. 1 is a graph that figuratively shows relations between time and temperature inside a container when using the organic waste in the quagmire state, to which oxygen is difficult to penetrate while the organic waste is left out and in which the biochemical reaction by microbial degradation is difficult to occur, and when forcefully supplying the oxygen inside the organic waste. The results were discovered by the inventor during a process of researching a method for effectively reaction treatment the organic waste that allows composting and reusing the organic waste in the quagmire state having a high water content ratio, and reducing the volume of the organic waste and treating the organic waste. In addition, these results show a "biochemical reaction zone" (first reaction stage), in which, when the organic waste having a high water content ratio is placed in an airtight container and when a pressure is increased slightly, more oxygen enters into the organic waste compared to when the pressure is not increased, causing the self-heating by the microbial degradation to be promoted. Further, these results show a "chemical reaction zone" (second reaction stage), in which the temperature in the container increases to 100° C. and further to 200° C., which exceed the temperature at which the self-heating by the microbial degradation ends (around approximately 70° C.).

[Method for Reaction Treatment of Organic Waste]

The method for reaction treatment of the organic waste according to this invention can be categorized into three types. The first type is a reaction treatment method that uses the phenomenon in the biochemical reaction zone shown in FIG. 1. The second type is a reaction treatment method that uses the phenomenon in the biochemical reaction zone and the phenomenon in the chemical reaction zone shown in FIG. 1. The third type is a reaction treatment method that uses the phenomenon in the chemical reaction zone shown in FIG. 1.

(First Reaction Treatment Method)

First, the first reaction treatment method is explained. The first reaction treatment method is a method for reaction treatment of the organic waste, in which oxygen is difficult to penetrate when the organic waste is left out, and in which the biochemical reaction by microbe is difficult to occur, by accelerating the biochemical reaction of the microbe. In particular, the first reaction treatment method realizes efficiently composting and resourcing the organic waste and the like in the quagmire state. Specifically, the first reaction treatment method is a method to increase an internal temperature of the organic waste to which the oxygen is supplied, to continue the biochemical reaction by maintaining the increased temperature, and to compost the organic waste.

Livestock excreta (wastes) excreta (wastes) human excreta (wastes), agricultural waste, swage sludge, food waste (food residuum) such as food scraps, and the like, which can cause the biochemical reaction by microbial degradation, are the examples of the organic waste. Cows, pigs, horses and the like are the examples of livestock. Specifically, an organic waste, in which oxygen is difficult to penetrate when the organic waste is left out, and in which a chemical reaction by microbe is difficult to occur, is the subject to the first reaction treatment method. Further, the first reaction treatment method is more effective to the organic waste that is entirely or locally in the quagmire state so that air permeability is low.

When the organic waste is the livestock excreta (wastes), the agricultural waste, and the like, which include a significant amount of fiber, the water content ratio of the entire organic waste is equal to or greater than 80% or locally equal to or greater than 80% although the water content ratio of the entire organic waste is low. Because the organic waste having such a high water content ratio is in the quagmire state, the oxygen needed to cause the biochemical reaction by microbe is difficult to enter inside the organic waste from its surface in the quagmire state. Therefore, the biochemical reaction by microbe is difficult to accelerate, and an increase of the internal temperature based on the biochemical reaction is low. As a result, a long period of time is required for the so-called composting. However, according to the first reaction treatment method, because the oxygen is forcefully supplied to the inside of the organic waste, the temperature inside the organic waste, into which the oxygen is supplied, is quickly increased by the biochemical reaction. In addition, if the reaction container in which the organic waste is placed is covered by a heat insulating material so as to maintain the increased temperature, the active biochemical reaction can be continued, and thus, the composting of the organic waste can be accelerated. Moreover, the reaction treatment method of this invention is more effective with the organic waste having a higher water content ratio. The reaction treatment method of this invention is particularly utilized for the organic waste having a high water content ratio, such as equal to or greater than 83% or 87%.

When the water content ratio of the entire organic waste or the local water content ratio of the organic waste is less than 80%, the phenomenon that the oxygen is difficult to enter inside the organic waste measurably weakens, and therefore, the need to forcefully supply the oxygen inside the organic waste decreases. The oxygen enters inside the organic waste even when the organic waste is the organic waste is left out, and the temperature gradually increases due to the biochemical reaction. Accordingly, with the water content ratio being less than 80%, the means unique in the first reaction treatment method, which is to forcefully supply the oxygen inside the organic waste, does not necessarily need to be used. However, it may be used from a viewpoint to accelerate the biochemical reaction.

In addition, when the organic waste is the food waste, such as food scraps, the water content ratio of the entire organic waste is equal to or greater than 40%, or locally equal to or greater than 40% although the water content ratio of the entire organic waste is low. If the organic waste includes a significant amount of fiber, such as the above-discussed livestock excreta (wastes), the agricultural waste, and the like, the entire or local water content ratio is equal to or greater than 80%, and the organic waster becomes in the quagmire state. However, the food scraps and the like, which do not include a large amount of fiber, becomes in the quagmire state under 80%, and normally tend to becomes in the quagmire state at 40% or greater. Therefore, in the first reaction treatment method, even with the food waste in the quagmire state having such a water content ratio, the internal temperature can be quickly raised by forcefully supplying the oxygen inside the food waste and causing the biochemical reaction. Therefore, the composting of the organic waste is further accelerated.

The term "entirely" with respect to the water content ratio indicates a ratio at which the moisture is included in the organic waste equally or relatively equally. On the other hand, the "locally" with respect to the water content ratio indicates a case where the water content ratio of the entire organic waste is less than 80% (for livestock excreta and the like) or less than 40% (for food waste such as food scraps), but the organic waste locally includes parts in the quagmire state with the water content ratio being equal to or greater than 80% or 40%, respectively.

Measurement of the water content ratio of the entire organic waste can be evaluated by obtaining a predetermined amount of a sample of the organic waste and performing a mass measurement of the sample before and after drying the sample. In contrast, the local water content ratio of the organic waste can be evaluated by obtaining a small amount of a local sample of the organic waste and performing a mass measurement of the sample before and after drying the sample.

The supply of oxygen inside the organic waste is accomplished forcefully. By such forceful supply [of the oxygen], the biochemical reaction is accelerated in the organic waste into which the oxygen is difficult to penetrate. The oxygen to be supplied may be an oxygen gas or a mixture gas of oxygen and another gas. Normally, generic air that includes approximately 20% of oxygen is used.

A detailed examples of the means for forcefully supplying the oxygen may be placing the organic waste under a slightly compressed-air environment including oxygen, directly injecting the oxygen inside the organic waste, and the like.

The above-discussed oxygen supply means provides the slightly compressed-air environment by placing the organic waste in a pressure-increasable airtight container and injecting air in the container, as shown in FIG. 2. In this means, the pressure in the container is preferably greater than the atmospheric pressure (1 MPa) and equal to or less than 15 MPa. Within such a pressure range, the oxygen can be easily introduced inside the organic waste. In addition, an expensive pressure container or the like need not be used. In addition, for more effective supply of oxygen, the pressure in the container is preferably equal to or greater than 2 MPa and equal to or less than 10 MPa. From a viewpoint of an inexpensive container, the pressure is preferably equal to or greater than 2 MPa and equal to or less than 5 MPa.

In contrast, for the later oxygen supply means, an airtight container or an open container may be used. This means places the organic waste in the container and directly supplies the oxygen. More specifically, this means may run a plurality of tubes into the organic waste and inject air (oxygen) in the tube to supply the oxygen into the organic waste. With the same concept, other structural forms may be used.

Under a gas that includes the oxygen, a biochemical reaction due to organic degradation by microbe in the organic waste occurs. This biochemical reaction generates metabolic heat, and thereby, the temperature of the organic waste increases to around approximately 70° C. In the first reaction treatment method, because the oxygen is forcedly supplied to the organic waste in the quagmire state, in which the oxygen is difficult to penetrate inside the organic waste the organic waste is left out and the biochemical reaction by the microbe is difficult to occur, the temperature increases as the biochemical reaction is accelerated, and the water content ratio is changed to an appropriate moisture condition due to evaporation of the moisture, thereby the organic degradation by microbe is further accelerated, resulting the composting and the like to be accelerated.

Further, according to this reaction treatment method, the biochemical reaction by microbe takes place with existence of oxygen in the organic waste. By using the airtight container, the capturing of ammonium generated resultantly by the microbial degradation. Therefore, effective odor measures become possible, and odor pollution to the ambient environment, which is often associated with reaction treatment organic waste, can be reduced.

As discussed above, according to the first reaction treatment method, even with the organic waste in the quagmire state, in which the oxygen is difficult to penetrate inside the organic waste the organic waste is left out and in which the biochemical reaction by microbe is difficult to occur, the oxygen can be forcedly supplied inside the organic waste. Therefore, the biochemical reaction of the organic waste can be accelerated and maintained, and the composting and resourcing the organic waste can be realized. Such a reaction treatment method is different from the conventional technique that dries the moisture by heat or blown air or mixes agricultural by-products, such as sawdust. The reaction treatment method can achieve accelerating the microbial degradation of the organic waste having a high water content ratio and composting the organic waste, thereby realizing a volume reduction of the organic waste by drying.

(Second Reaction Treatment Method)

Next, the second reaction treatment method is explained. Similar to the above-discussed first reaction treatment method, the second reaction treatment method includes the first reaction stage of composting and resourcing the organic waste (especially the one in the quagmire state), in which, when the organic waste is left out, the oxygen is difficult to penetrate inside and in which the biochemical reaction by microbe is difficult to occur, by accelerating the biochemical reaction, and the second reaction stage of reducing the volume of the organic waste or carbonizing the organic waste. More specifically, the method includes the first reaction stage, in which the oxygen is forcedly supplied inside the organic waste, the internal temperature of the organic waste to which the oxygen is supplied is increased by the biochemical reaction, and the biochemical reaction is continued by maintaining the increased temperature, and the second reaction stage, in which an exothermic reaction is generated by placing the organic waste after the first reaction stage under oxygen and carbon monoxide to reduce the volume of the organic waste or carbonizing the organic waste.

For the second reaction treatment method, because the first reaction stage is the same as the first reaction treatment method, discussion of the technical issues (organic waste, its water content ratio, supply of oxygen, and the like) and effects that were discussed above in the explanation of the first reaction treatment method is omitted.

The second reaction stage is a step in which a reaction after the first reaction stage occurs. It is a reaction stage, in which the organic waste after the first reaction stage, that is, after disposed by the first reaction treatment method, is placed under the oxygen and carbon monoxide to cause an exothermic reaction, and in which the volume of the organic waste is reduced or the organic waste is carbonized.

The organic waste used in the second reaction stage needs to be at 55° C. or greater in the first reaction stage. In addition, although the water content ratio is not particularly limited, it should be the same or slightly less as that at the beginning of the first reaction stage. For example, the water content ratio is often in a range approximately equal to or greater than 30% and less than 80%.

The inventor discovered that heat is generated in the organic waste by placing the organic waste under the oxygen and carbon monoxide. The second reaction stage is a stage to cause the exothermic reaction. As a result, the volume of the organic waste can be reduced, or the organic waste can be carbonized.

Even though, details of the exothermic reaction are not sufficiently ascertained, it is presumed that the reaction is at least one of an exothermic reaction in which the oxygen reacts on the organic waste to generate carbon dioxide, an exothermic reaction in which the oxygen reacts on the organic waste to generate carbon monoxide, and an exothermic reaction in which the carbon monoxide and oxygen react to generate carbon dioxide.

The second reaction stage may be performed under a hermetic environment or an environment open to the air, as long as the oxygen of a level similar to at least the atmospheric air exists. If the first reaction stage is performed under a hermetic environment, the second reaction stage may be performed under the same hermetic environment used for the first reaction stage, or may be performed under the environment open to the air. If the reactive conditions for the first and second reaction stages are met, these environments may be reversed.

For the second reaction stage, the existence of carbon monoxide is necessary. The carbon monoxide is generated by an incomplete reaction with the organic waste obtained from the first reaction stage with the oxygen. Concentration of the generated carbon monoxide is equal to or greater than 50 ppm, more preferably, equal to or greater than 100 ppm. With the concentration of carbon monoxide being equal to or greater than 50 ppm, the exothermic reaction becomes active in the second reaction stage, and the temperature remarkably increases. Therefore, drying and/or carbonizing the organic waste are accelerated. With the concentration of carbon monoxide being less than 50 ppm, the exothermic reaction is slightly insufficient, and the temperature does not increase as much, compared to the case of the concentration being equal to or less than 50 ppm. Therefore, the acceleration of the drying and/or carbonizing of the organic waste is slower.

The carbon monoxide is generated for the reaction of the organic waste and oxygen. However, the carbon monoxide only needs to be included in the container in which the second reaction stage is performed. In such a case, the organic waste is preferably placed in the hermetic environment, in which the carbon monoxide is not open to the air.

On the other hand, the carbon monoxide generated inside the organic waste is hardly released outside the organic waste. Therefore, the carbon monoxide may further cause the exothermic reaction by reacting with the oxygen inside the organic waste. Therefore, in such a case, the organic waste may be placed under the environment open to the air. Of course, the organic waste may be under the hermetic environment. The condition, in which the carbon monoxide generated inside the organic waste is hardly released outside the organic waste, may be, for example, a case in which air permeability at a part of the inside of the organic waste is not sufficient, and in which carbon monoxide is locally generated.

The temperature of the organic waste in the second reaction stage is preferably at least equal to or greater than 55° C. and more preferably equal to or greater than approximately 70° C. The temperature becomes particularly important when transitioning from the first reaction stage to the second reaction stage. That is, in the first reaction stage, the temperature increases as a result of the biochemical reaction by microbe. Normally, the temperature increases to around approximately 70° C. With the temperature at around approximately 70° C., the second reaction stage can be smoothly commenced, and the exothermic reaction between the organic waste and oxygen and/or carbon monoxide and/or the exothermic reaction between the carbon monoxide and oxygen can be easily occurred. Moreover, even when the temperature is not reached to such a level, as long as the organic waste is at a temperature of at least equal to or greater than 55° C., and as long as the oxygen and carbon monoxide are provided to the organic waste, the above-discussed exothermic reactions occur, and the temperature increases. Therefore, the further exothermic reactions can be easily occurred.

The time (period) required for reaction treatment of the organic waste depends on the type and conditions, such as the water content ratio, of the subject organic waste. The number of days needed for the temperature to increase to around approximately 70° C. in accordance with the above-discussed first reaction treatment method or the first reaction stage of the second reaction treatment method may normally be approximately equal to or greater than 0.5 days and equal to or less than 3 days. The number of days needed for the temperature to increase to 100° C. or 200° C., for example, in accordance with the second reaction stage of the second reaction treatment method may be equal to or greater than 3 days and equal to or less than 14 days. Therefore, depending on the amount of the organic waste to be disposed, it is preferable that a multiple number of reaction treatment containers and later-discussed reaction treatment devices are used.

According to the above-discussed second reaction treatment method, by placing the organic waste in the presence of oxygen and carbon monoxide to cause chemical reactions, as the second reaction stage that takes place after the first reaction stage, which is the first reaction treatment method, the temperature can be raised to 100° C. or 200° C., which exceeds the temperature (around approximately 70° C.) at which the self-heating by microbial degradation ends. As a result, the organic waste can be sufficiently composted and further dried, causing the volume of the organic waste to be reduced. Moreover, due to the further increase of temperature, the organic waste can be carbonized. Therefore, further volume reduction can be realized at low cost. With the second reaction treatment method, because the organic waste is dried and/or carbonized when it is sufficiently composted. Therefore, even when the organic waste is disposed in soil again, the organic waste does not return to its original quagmire state, as conventionally been so.

Further, more particularly, with the temperature of the organic waste being at least equal to or greater than 55° C., and with the concentration of the carbon monoxide originated from the organic waste after the first reaction stage being equal to or greater than 50 ppm, the second reaction stage can be easily and efficiently accelerated. As a result, the temperature can easily exceed the temperature (around approximately 70° C.) at which the self-heating by the microbial degradation ends, and reaches to a high temperature, such as 100° C. or 200° C.

(Third Reaction Treatment Method)

Next, the third reaction treatment method is explained. The third reaction treatment method relates to the second reaction stage that is the same as that for the second reaction treatment method. However, unlike the first and second reaction treatment methods, the third reaction treatment method achieves the volume reduction and reaction treatment of the organic waste that is not limited to the one in the quagmire state. In particular, same as the second reaction stage of the second reaction treatment method, the third reaction treatment method reduces the volume of, or carbonizes, the organic waste by causing the exothermic reaction of the organic waste by placing it in the presence of oxygen and carbon monoxide and by causing the further exothermic reaction of the organic waste at the temperature of at least equal to or greater than 55° C. by placing it under an environment with the carbon monoxide of a concentration equal to or greater than 50 ppm.

With the third reaction treatment method, the water content ratio of the organic waste is disregarded, and the organic waste need not be in the quagmire state. Therefore, the third reaction treatment method may be used for an organic waste that is not disposed by the first reaction treatment method or the second reaction stage of the second reaction treatment method. For example, the third reaction treatment method may be used for the organic waste that has been composted. In addition, the third reaction treatment method may be used for organic wastes formed by dry-type biomass materials having carbon as its substrate, such as cow excreta with a low water content ratio, wood chips and brown rice. The third reaction treatment method may be used to compost or carbonize any of these organic wastes. It is preferable that the carbon monoxide is originated from these organic wastes.

Furthermore, the temperature of the organic waste or the concentration of carbon monoxide according to the third reaction treatment method are the same as the second reaction stage of the second reaction treatment method. Therefore their explanations are omitted.

As discussed above, according to the third reaction treatment method, by placing the organic waste (biomass material), which has resulted the exothermic reaction in the presence of oxygen and carbon monoxide, under a gas of carbon monoxide concentration at the above-discussed temperature, the resulted exothermic reaction is further accelerated remarkably, and the temperature increases to 100° C. or 200° C. As a result, the organic waste (biomass material) can be sufficiently dried, and its volume can be reduced. Moreover, the organic waste can be carbonized as a result of the further temperature increase. Therefore, the volume reduction can be achieved at low cost. Further, according the reaction treatment method of the third aspect, because the organic waste can be sufficiently dried and carbonized, the organic waste does not return to its original quagmire state even when it is disposed in soil.

(Reaction Treatment Device)

Next, a reaction treatment device for the organic waste is explained. FIG. 2 is a structural diagram showing an example of the reaction treatment device for the organic waste according to this invention. The reaction treatment device shown in FIG. 2 is a device that adapts the reaction treatment method of this invention discussed above, which places the organic waste under a hermetic environment and holds such environment in a slightly compressed state. In particular, as shown in FIG. 2, the reaction treatment device includes a sealable container 2 that allows receiving the organic waste, and a pressure controlling device that can control the pressure of the container 2 above the atmospheric pressure and equal to or below 15 MPa.

The container is a container that receives the organic waste and holds an internal pressure above the atmospheric pressure and equal to or below 15 MPa, for example. The container 2 includes an open and close part (not shown) from and into which the organic waste is removed and received. The open and close part may be a lid form or a door form. Its form is not particularly limited. The material of the container is also not particularly limited. The material may have an anti-corrosion characteristics against the organic waste or a material with heat durability. For example, the material may be stainless steel.

It is preferable that the container is provided with a concentration meter for the carbon monoxide and/or thermometer (both not shown). The thermometer is useful for measuring the temperature at the time of biochemical reaction and/or chemical reaction discussed in the reaction treatment method of this invention and for checking the progress and the like of each reaction. In addition, the carbon monoxide meter is useful for measuring the concentration of carbon monoxide at the time of chemical reaction discussed in the reaction treatment method of this invention and for checking the progress and the like of the chemical reaction. Such measurement devices may be commercial products and installed at any position.

Moreover, it is preferable that a pressure meter (not shown) is also provided. The pressure meter measures the pressure inside the container and may be used for adjusting the pressure in the container 2.

The pressure controlling device is a device for adjusting the pressure inside the container 2 at a predetermined level. The device 10 shown in FIG. 2 includes a high pressure gas tank 1, a gas intake tube 3 that connects the tank 1 and the container 2, a first valve 4 that is provided at the gas injection tube 3, tank 1 or container 2 and adjusts an amount of gas to be provided inside the container, a gas exhaust tube 5 that exhausts the gas inside the container 2, and a second valve 6 that is provided at the container 2 or gas exhaust tube 5 and adjusts the amount of gas in the container 2.

The high pressure gas tank 1 may be a tank with compressed air. The first valve 4 and the second valve 6 may be a cock-type manually controlled valve. However, it is preferably an automatically controlled valve driven based on a data from the pressure meter. By accurately controlling the pressure in the container 2, the reaction of the organic waste can be stably performed.

The reaction treatment device 10 is an example of the reaction treatment device for this invention and is not limited to the structural form shown in the figure. The tank 1 may be replaced by a pressure applying means, such as an air compressing pump or a compressor. In addition, a pressure check valve (not shown) that prevents the pressure inside the container from back-flowing towards the tank due to an increase of the pressure caused by with the increase in internal temperature, may be provided at the gas injection tube 3. Moreover, a heat insulating chamber 7 may be preferably provided around the container 2. The heat insulating chamber 7 maintains the temperature of the container 7 and prevents the rate of the biochemical reaction by the microbe on the organic waste in the container in the first reaction stage and the rate of chemical reaction for the second reaction stage from slowing down.

According to such reaction treatment device 10, because a sealable container and a pressure controlling device are included, by placing the organic waste in the quagmire state, into which the oxygen is difficult to penetrate when the organic waste is left out, and in which the biochemical reaction by microbe is difficult to occur, and by applying the predetermined pressure after sealing the container, the oxygen can be forcedly supplied inside the organic waste. As a result, the biochemical reaction by the microbial degradation takes place inside the organic waste, and the composting and drying of the organic waste, for example, can be accelerated. Because the pressure to be controlled is not particularly high, it is not necessary to use an expensive pressure container. Therefore, the reaction treatment device of this invention can achieve the above-discussed reaction treatment method for the organic waste simply and at low cost.

(Method for Using Heat Energy)

Next, a method for using the heat energy that utilized the principle of generating heat at the time of the reaction treatment method of this invention is discussed. The method for using heat energy according to this invention is a method for using, as a heat source, the heat generated by performing the second reaction stage of the reaction treatment method for the organic waste according to the second aspect of this invention, or heat generated by performing the reaction treatment method for the organic waste according to the third aspect of this invention.

This method for utilizing the heat energy uses the heat generated by the chemical reaction of the organic waste when placed under the existent of oxygen and carbon monoxide at a temperature equal to or greater than the predetermined degrees, which cause the temperature to increase to a higher temperature, according to the second reaction stage of the second reaction treatment method or the third reaction treatment method.

As a detailed method for utilizing the heat energy, a method that exchanges the heat of water vapor generated after disposing organic waste in the container, as a heat source, may be used. In this case, a heat exchanger may be used. The heat exchanger may be provided directly or via a pipe to the container such that a high temperature vapor is introduced from the container and provided externally as a high temperature-side heat source.

Alternatively, the method may utilize, for cooling and warming the air, the water vapor generated after reaction treatment of organic waste in the container, as a heat source for a cooling agent.

Because it takes approximately equal to or more than 3 days and equal to or less than 14 days for the temperature of the organic waste to raise its temperature to 100° C. or 200° C., for example, in the case when the heat generated from the chemical reaction is to be used as a heat source, a multiple number of the reaction treatment devices shown in FIG. 2 may be provided, and the reaction treatment devices may be operated as the introduction period for the organic waste is sequentially shifted, so that the heat source can be continuously used.

For such utilization, it is preferable that the vapor that was cooled down by a heat exchanger is circulated into the reaction treatment container again to recycle the moisture. By doing so, carbonization of the organic waste can be suppressed, and the organic waste can be continuously used for a relatively long time as a heat resource.

EXAMPLES

Next, the method of reaction treatment of the organic waste according to this invention is explained in detail by referring to specific experiments.

Experiment 1

As Experiment 1, a reaction test was performed under a slightly high pressure. As a sample for the test, excreta (wastes) of milk cow obtained from a farm of the Agricultural Dept. of Utsunomiya University was used in the test after adjusting its water content ratio at approximately 50-60% w.b. and being the organic waste is left out at 30° C. for approximately 15 hours. For the test device, a slightly high pressure reaction device having a structural form similar to the one shown in FIG. 2 is used. 220 g of a sample (water content ratio: 51.6 w.b. %) is placed in a 1-liter reactor. After closing the exhaust opening of the reactor, air is fed into the reactor from the air tank to maintain the pressure in the reactor at 1 MPa. The test was completed when the temperature reached to approximately 110° C. to 120° C. in consideration of the characteristics of the test device used.

The gas during the reaction of Experiment 1 was analyzed. Concentration of the gas during the reaction was measured using a gas detector (GASTEC, Japan). For the slightly high pressure reaction, the gas was collected with a 1-liter gas collection bag and measured. For the pressureless reaction, the gas was directly measured from the exhaust opening of the reactor. The gas subject to the analysis was oxygen, carbon monoxide, carbon dioxide and ammonium.

Experiment 2

As Experiment 2, a reaction test was performed under a normal pressure. The same sample as the one used in Experiment 1 was used for the test. The test device was so the same was the one used in Experiment 1. 250 g of the sample (water content ratio: 61.0 w.b. %) was placed in a 1-liter reactor. Approximately 0.6 L·min$^{-1}$·kg-vm$^{-1}$ of air was flown in the reactor. After reaching a composting temperature at approximately around 70° C., an air intake opening and an air exhaust opening of the reactor were closed to seal the reactor under a normal pressure. This test was also terminated when the temperature reached to approximately 110° C. to 120° C. in consideration of the characteristics of the test device used. The gas analysis similar to that performed in Experiment 1 was also performed in Experiment 2.

(Result of Temperature Changes)

FIG. 3 is a graph showing temperature changes in Experiment 1 (slightly high pressure reaction test) and Experiment 2 (pressureless reaction test). In FIG. 3, symbol A indicates the slightly high pressure reaction test of Experiment 1, symbol B indicates the pressureless reaction (composting+sealing the reactor) of Experiment 2, and symbol C indicates a point of time at approximately 75° C., at which the reactor was sealed (composting) in Experiment 2. In the slightly high pressure reaction test of Experiment 1, the temperature increased linearly from approximately 70° C. to near approximately 90° C. and then increased exponentially. In addition, in the pressureless reaction test of Experiment 2, the temperature increased linearly from approximately 75° C., at which the reactor was closed, until the test was ended. In both cases, the temperature reached approximately 120° C., which is not possible with the conventional posting. Moreover, with a container that resists a high temperature, it was confirmed that the temperature reached 200° C. in both cases, although the number of days needed to reach the temperature was different.

(Result of Rate for Generating Heat)

In Experiments 1 and 2, the obtained heat profiles were analyzed to calculate the rate for generating the heat. FIG. 4 shows the result of the calculation. In FIG. 4, symbol A indicates the slightly high pressure reaction test of Experiment 1, and symbol B indicates the pressureless reaction (composting+sealing the reactor) of Experiment 2. In both cases, peaks of the heat generating rate were observed at approximately 40° C. and approximately 60° C. between the normal temperature to approximately 70° C. These are understood certainly as the peaks for activities by mid-temperature microbe and high-temperature microbe that are observed in the normal composting. However, the microbial activity up to approximately 70° C. is higher in the pressureless reaction test.

On the other hand, the reaction above approximately 70° C. is not possible in the conventional composting, and therefore, it is unlikely that the reaction was caused by microbe. From this, in both the slightly high pressure reaction test and the pressureless reaction test, two kinds of reactions are accelerated based on the increase of temperature. That is, as shown in FIG. 4, there are the reaction between the normal temperature to hear approximately 70° C. (phase A) and the reaction that takes place above approximately 70° C. (phase B). The reaction in phase A is similar to composting. As a result of analyzing the organic degrading by microbe, it is understood as a biochemical reaction in which a metabolic heat is generated to increase the temperature. On the other hand, the reaction in phase B is not observed in the conventional composting. It is understood that the temperature is increased by a chemical reaction.

(Result of the Gas of Experiment 1)

FIG. 5 is a graph showing changes of temperatures and gas concentrations in the slightly high reaction test of Experiment 1. Immediately after the commencement of the reaction, oxygen was consumed by the activity of microbe, thereby reducing the concentration of oxygen and increasing the concentration of carbon dioxide. To the temperature near approximately 80° C., the concentration of oxygen and the concentration of carbon dioxide transitioned at the same level. However, above approximately 80° C., the concentration of oxygen decreased, and the concentration of carbon dioxide increased.

In contrast, concentration of the carbon monoxide increased by time. The increase of the carbon monoxide was remarkable at the temperature equal to or greater than approximately 80° C. Decrease of concentration of the oxygen at the temperature equal to or greater than approximately 90° C. is presumed to originate from the consumption of oxygen by the reaction of carbon that forms the sample (cow excreta) and oxygen ($C+O_2=CO_2+94.1$ kcal, $C+\frac{1}{2}O_2=CO+26.4$ kcal), and the reaction of carbon monoxide and oxygen ($CO+\frac{1}{2}O_2=CO_2+67.6$ kcal). Similarly, it is presumed that the concentration of carbon dioxide increased by the above-discussed reactions. In addition, because the above reaction is an exothermic reaction, it is presumed that the temperature increase in phase B is originated from each of such chemical reactions.

(Result of Gas Analysis in Experiment 2)

FIG. 6 is a graph showing changes of temperature and gas concentration during the pressure reaction test of Experiment 2. Similar to the slightly high pressure reaction, the concentration of oxygen decreased, and the concentration of carbon dioxide increased immediately after commencement of the reaction, as a result of microbial activities. However, in the pressure reaction test, air was flown into the reactor until the temperature reached approximately 75° C. Because this is no different from the conventional composting reaction, the concentration of oxygen that once decreased increased again, and the concentration of carbon dioxide also decreased. In contrast, with respect to the concentration of carbon monoxide, approximately 10-50 ppm of carbon monoxide was exhausted even with the normal composting reaction. Further, ammonium indicated a high exhaust concentration at the temperature being approximately 70° C. or greater.

For the pressureless reaction, the maximum temperature at the composition (phase A) is approximately 75° C. From this point, the gas intake opening and the gas exhaust opening of the reactor were closed. Immediately thereafter, the concentration of oxygen decreased rapidly to 6% or less, which is a detection range of the gas detecting tube. Based on this, it is presumed that the concentration of carbon dioxide increased due to the chemical reaction similar to that during the slightly high pressure reaction. In contrast, carbon monoxide started rapidly increasing after sealing the reactor and increased to 1500 ppm at approximately 100° C. However, despite the concentration of oxygen falling below the detection limit at approximately 80° C. to approximately 100° C., the concentrations of carbon monoxide and carbon dioxide became considerably high. For the carbon monoxide and carbon dioxide to be generated, oxygen is needed to bind with carbon or carbon dioxide. However, because the concentration of oxygen is extremely low, it is presumed that the oxygen is provided from the component of organic waste, although it has not been proven.

Regarding the mechanism of temperature increase during the pressureless reaction, similar to the slightly high pressure reaction, it is presumed that the temperature increased due to a biochemical reaction by microbe in phase A between the normal temperature and approximately 70° C. and the high temperature exceeding approximately 70° C. to approximately 120° C. was due to a chemical reaction of $C+O_2=CO_2+94.1$ kcal, $C+\frac{1}{2}O_2=CO+26.4$ kcal, and $CO+\frac{1}{2}O_2=CO_2+67.6$ kcal. Moreover, it was confirmed that the temperature increases to an extremely high temperature regardless of the existence of pressure. However, under the pressureless reaction, the temperature increase in phase B was linear, and the temperature and heat generation rate increased exponentially from approximately 90° C. with the slightly high pressure. Therefore, it is presumed that the pressure contributes to the exponential increase of the temperature above approximately 90° C.

(Study of Effects by Carbon Monoxide Under Phase B)

FIG. 7 is a graph showing results of changes in the temperature in the gas reaction test with oxygen and carbon monoxide only. If the reaction in phase B is originated by the gases mainly carbon monoxide, the temperature should increase by filling an empty reactor with only air and carbon monoxide. After filling the air and carbon monoxide in the reactor and forcedly heating the reactor from approximately 60° C. to approximately 80° C., it was confirmed that the temperature increased under the normal pressure and slightly high pressure with only the air and carbon monoxide. Of course, as a reference, the slightly high pressure reaction was performed with only the air, and the temperature did not increase. However, after conducting the test by mixing the air and "gas after the slightly high pressure reaction using cow excreta (wastes)," the temperature increased when the concentration of carbon monoxide is 100 ppm, but the temperature decreased when the concentration of carbon monoxide is equal to or less than 25 ppm. It was observed that a minimum concentration of carbon monoxide is needed to increase the temperature.

In contrast, in the case of performing the reaction using the air and carbon monoxide from a room temperature, the increase of temperature was not observed under the normal pressure and slightly high pressure. Therefore, it is presumed that a certain amount of temperature is required in order to initiate the reaction by the air and carbon monoxide. From these, it was proven that the reaction in phase B is a gaseous chemical reaction, and that the carbon monoxide involves with the reaction. In addition, it became apparent that minimum temperature and concentration of carbon monoxide are needed to initiate the reaction.

(Slightly High Pressure Reaction of Dry-Type Biomass)

FIG. 8 is a graph showing changes in temperature when performing the slightly high pressure reaction after heating dried cow excreta to approximately 50° C. to approximately 70° C. When initiating the slightly high pressure reaction from 70° C., the temperature increased even when the water content ratio is 0% w.b. Therefore, it was confirmed that the water content ratio of sample does not involve with the gaseous reaction in phase B. On the other hand, in the case of a reference (water content ratio: 69.5% w.b.) for which the slightly high pressure reaction was initiated under normal pressure, the temperature decreased. It is considered that the carbon monoxide needed for the temperature increase reaction was not sufficiently exhausted under normal pressure. Therefore, it was presumed that the pressure has an effect to cause the carbon monoxide to be easily generated from the sample which is the substrate.

Moreover, the increase in temperature was confirmed also when the initial temperature for the slightly high pressure reaction test is set at 55° C. However, the increase in temperature was not confirmed when the slightly high pressure reaction test was initiated from 50° C. Therefore, the chemical reaction by the gas mainly of carbon monoxide in phase B is considered to initiate at least 55° C. or greater.

FIG. 9 is a graph showing changes in temperature in the slightly high pressure reaction using dry-type biomass (wood chips, brown rice) excluding cow excreta. When performing the slightly high pressure reaction from approximately 70° C., the temperature increased both with the wood chips and brown rice. This means that the temperature can be increased if an organic matter (including C) that generates carbon monoxide exists. This supplements that the gaseous reaction in phase B starts at a temperature equal to or greater than 55° C., similar to the dried cow excreta.

(Degradation of Organic Matter in Phase B)

Table 1 shows changes of a VM ratio (organic matter content ratio) before and after the gaseous reaction in phase B. In phase B, the VM ratio before and after the reaction does not change. Therefore, degradation of organic matter cannot be expected. It is understood that the degradation of organic matter in the slightly high pressure reaction that starts from the room temperature and the pressureless reaction is mainly resulted from the microbial degradation in phase A.

TABLE 1

Changes Of A VM Ratio Before And After The Reaction

| | | | | VM ratio before the reaction, % | VM ratio after the reaction, % |
|---|---|---|---|---|---|
| cow excreta | 0% w.b. | starting from | 55° C. | 86.2 | 85.9 |
| cow excreta | 0% w.b. | starting from | 70° C. | 85.9 | 86.0 |
| cow excreta | 7.1% w.b. | starting from | 70° C. | 86.1 | 85.6 |
| cow excreta | 63.5% w.b. | starting from | 70° C. | 85.3 | 83.9 |
| wood chips | 0.2% w.b. | starting from | 70° C. | 99.5 | 99.4 |
| wood chips | 35.7% w.b. | starting from | 70° C. | 99.6 | 99.5 |
| brown rice | 11.2% w.b. | starting from | 70° C. | 98.0 | 97.4 |

From the results shown in FIGS. 3-9 and Table 1, the following statements can be made.

(1) A high temperature equal to or greater than 120° C. (confirmed up to approximately 200° C.) can be generated in both the slightly high pressure reaction and pressureless reaction (composting+sealed reactor).

(2) The temperature increased by the following two types of reactions in both the slightly high pressure reaction and pressureless reaction.

Reaction 1 (phase A: room temperature, approximately 70° C.): a biochemical reaction in which metabolic heat is generated by degradation of organic matter by microbe; and Reaction 2 (phase B: from approximately 70° C.): the following gaseous reactions in which carbon monoxide generated from the organic matter involves:

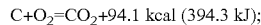

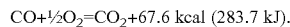

(3) The gaseous reaction in phase B is presumed to initiate with carbon monoxide equal to or greater than 50 ppm and temperature equal to or greater than 55° C. However, when generation of heat by microbe is expected, it is more effective to utilize, for temperature increase to 70° C., the biochemical reaction by microbe that produces a larger amount of heat.

(4) The gaseous reaction in phase B may increase the temperature with any substance that does not depend on a water content ratio or that has carbon as a substrate.

(5) Carbon monoxide is discharged from a normal composting reaction.

BRIEF DESCRIPTIONS OF FIGURES

DESCRIPTION OF SYMBOLS

Figure 1:
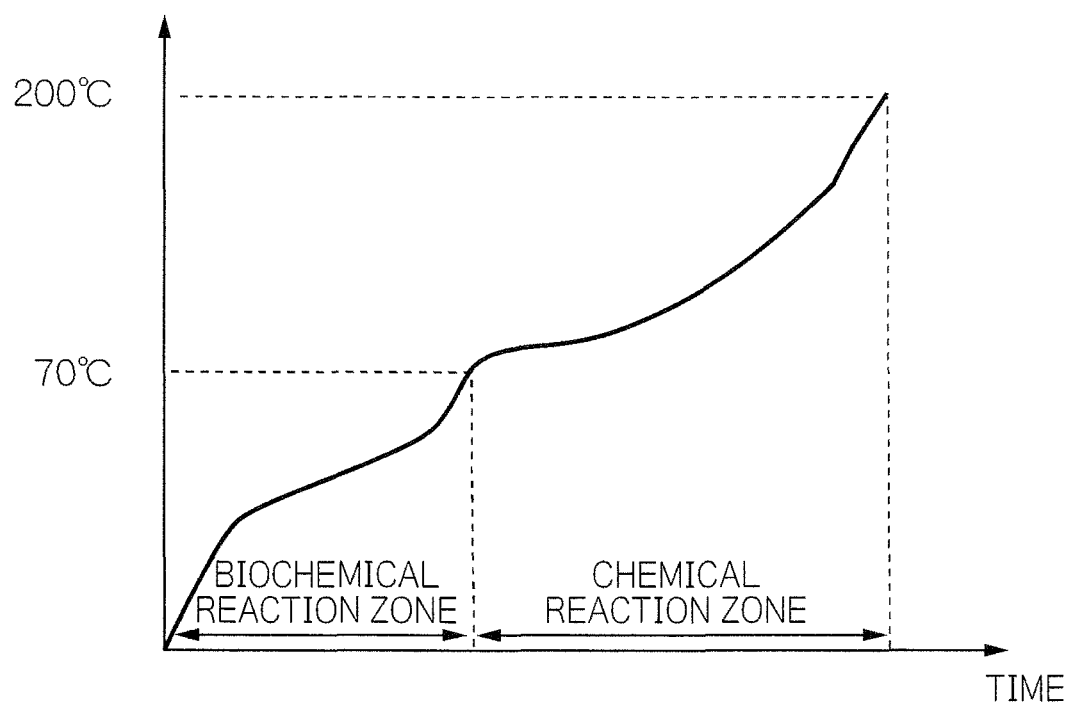
FIG. 1 is a graph that schematically shows a relationship between the time and temperature inside a container when oxygen is forcedly supplied inside an organic waste in a quagmire state, in which the oxygen is difficult to penetrate when the organic waste is left out, and in which biochemical reactions by microbe are difficult to occur.
Figure 2:
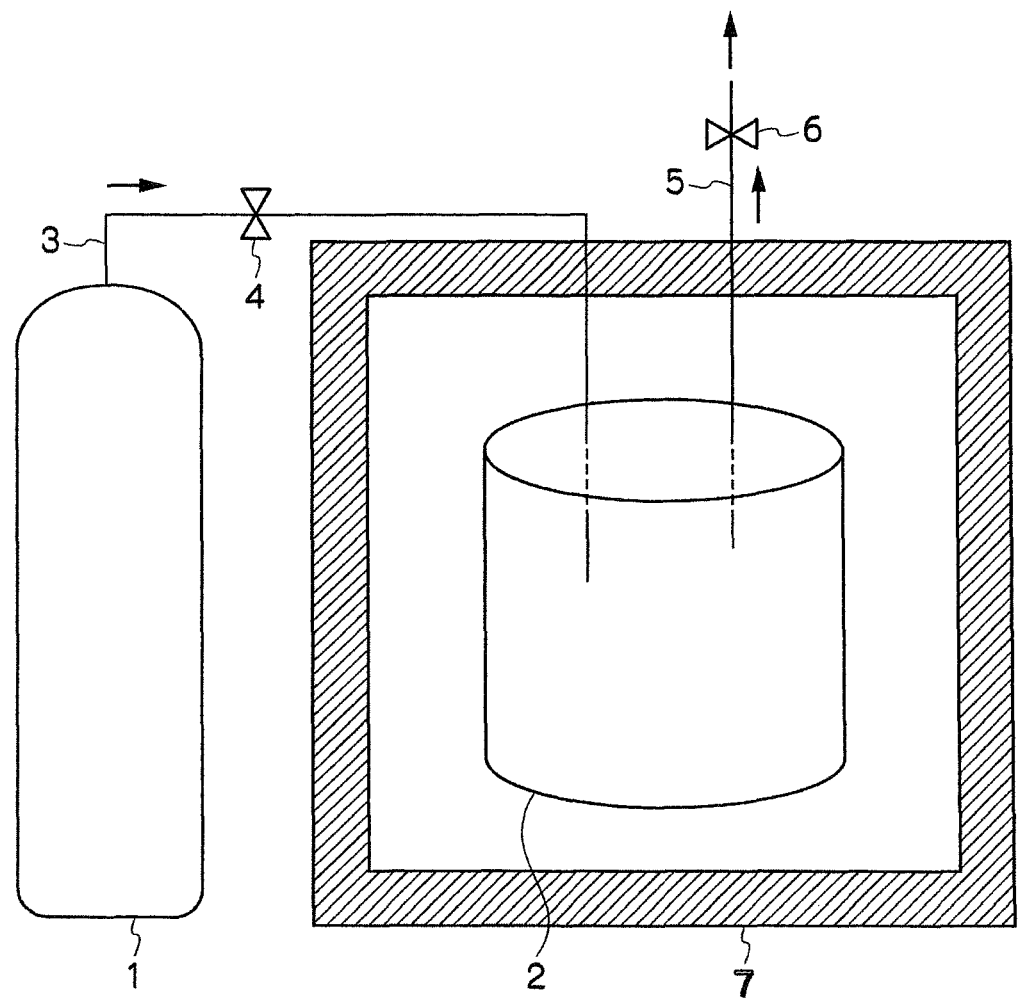
FIG. 2 is a structural diagram showing an example of a reaction treatment device for the organic waste of this invention.
Figure 3:
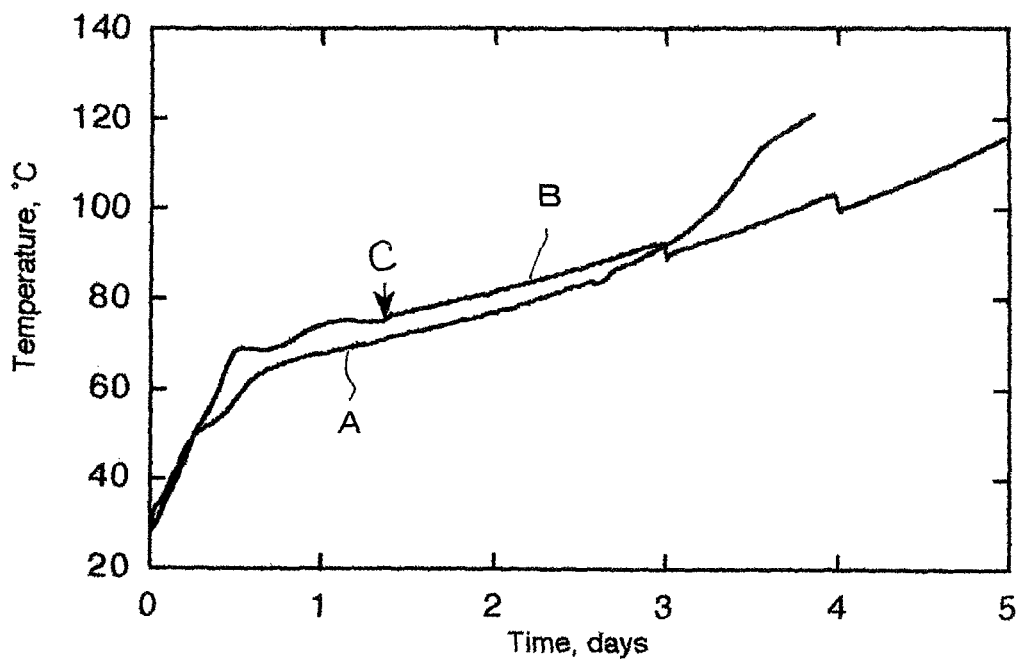
FIG. 3 is a graph showing changes of temperatures by Experiment 1 (slightly high pressure reaction test) and Experiment 2 (pressureless reaction test).
Figure 4:
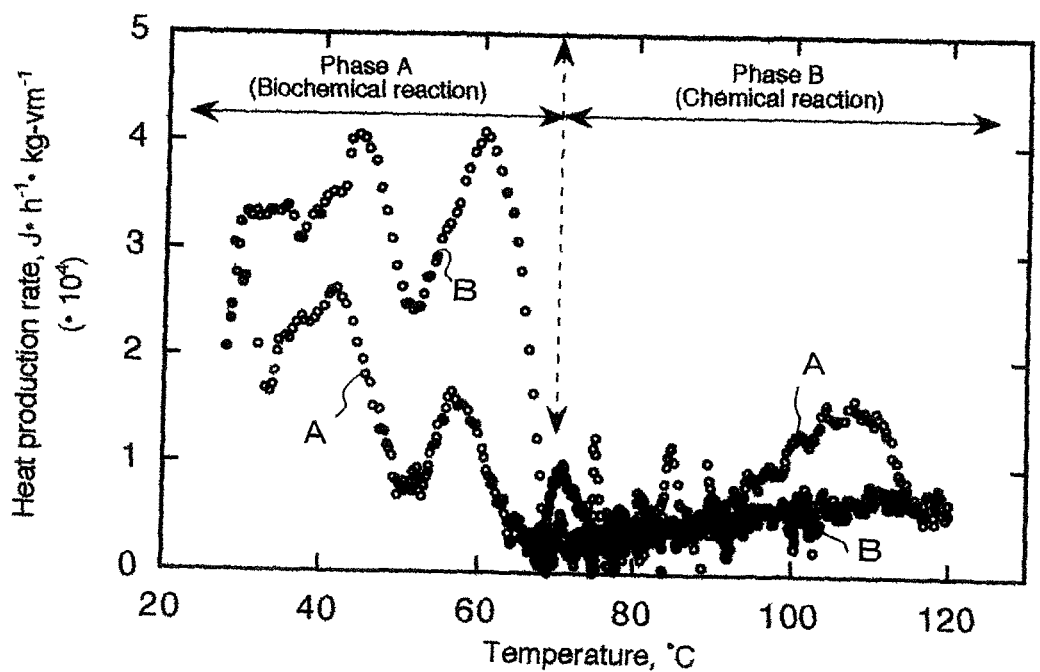
FIG. 4 is a graph showing results of heat generation rate obtained from analyzing temperature profiles from Experiments 1 and 2.
Figure 5:
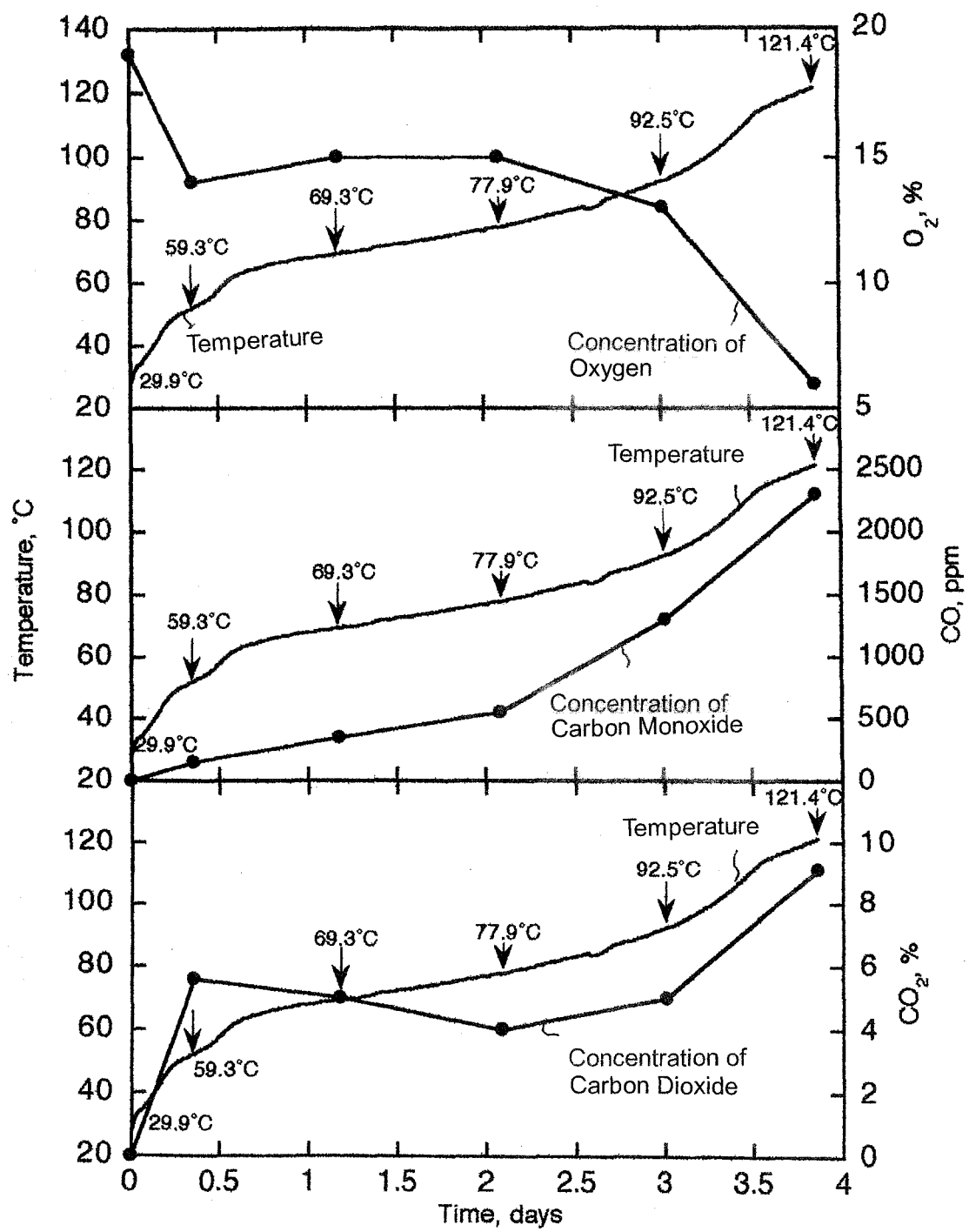
FIG. 5 is a graph showing changes of temperature and gas concentration in the slightly high pressure reaction test of Experiment 1.
Figure 6:
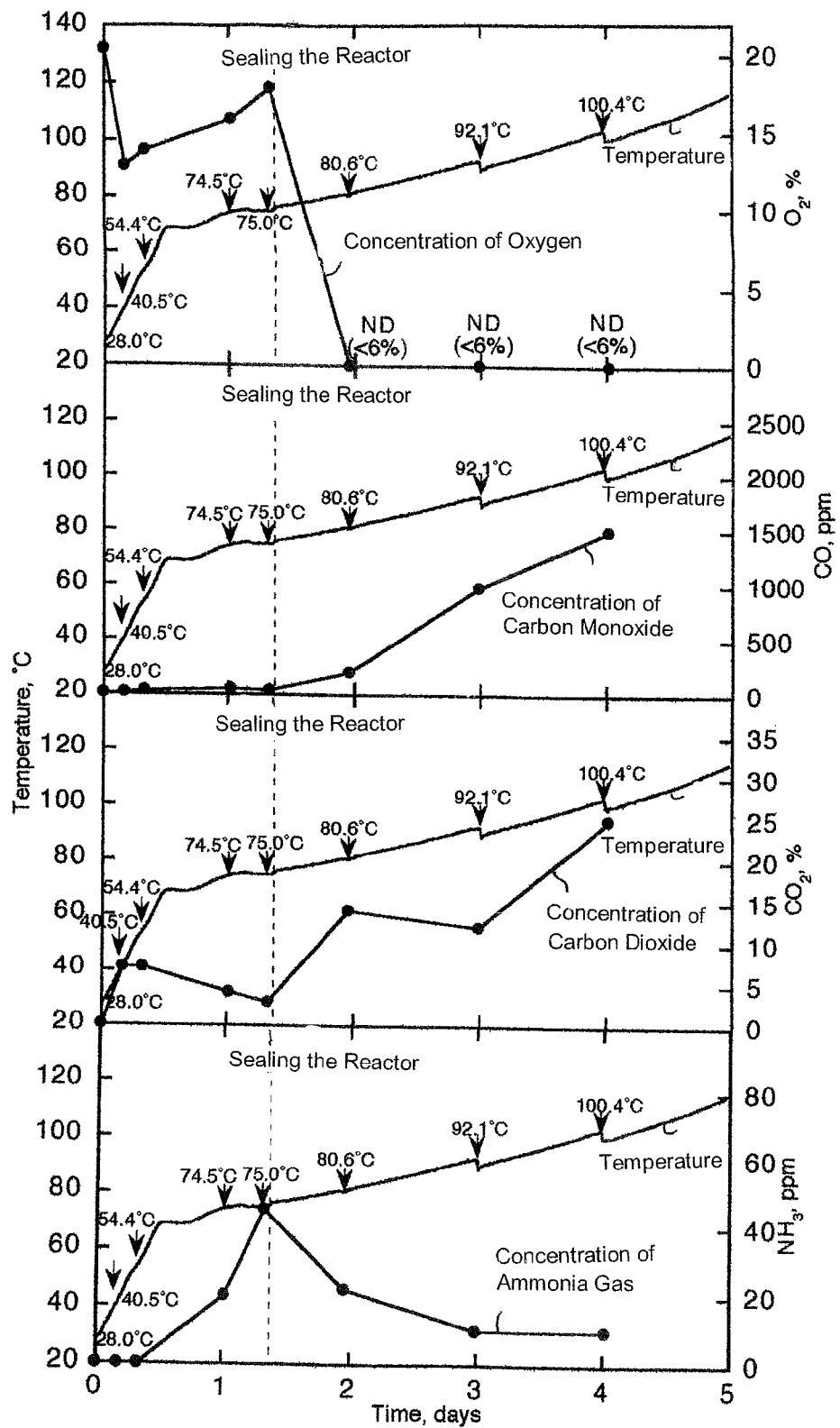
FIG. 6 is a graph showing changes of temperature and gas concentration in the pressureless reaction test of Experiment 2.
Figure 7:
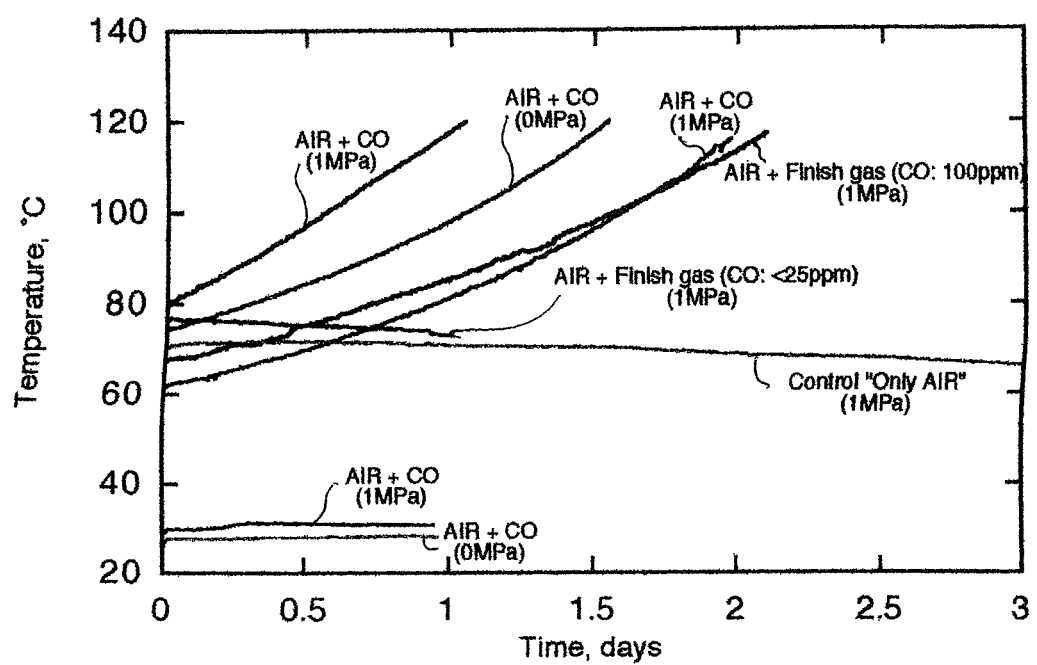
FIG. 7 is a graph showing results of temperature changes of gas reaction test using only air and carbon monoxide.
Figure 8:
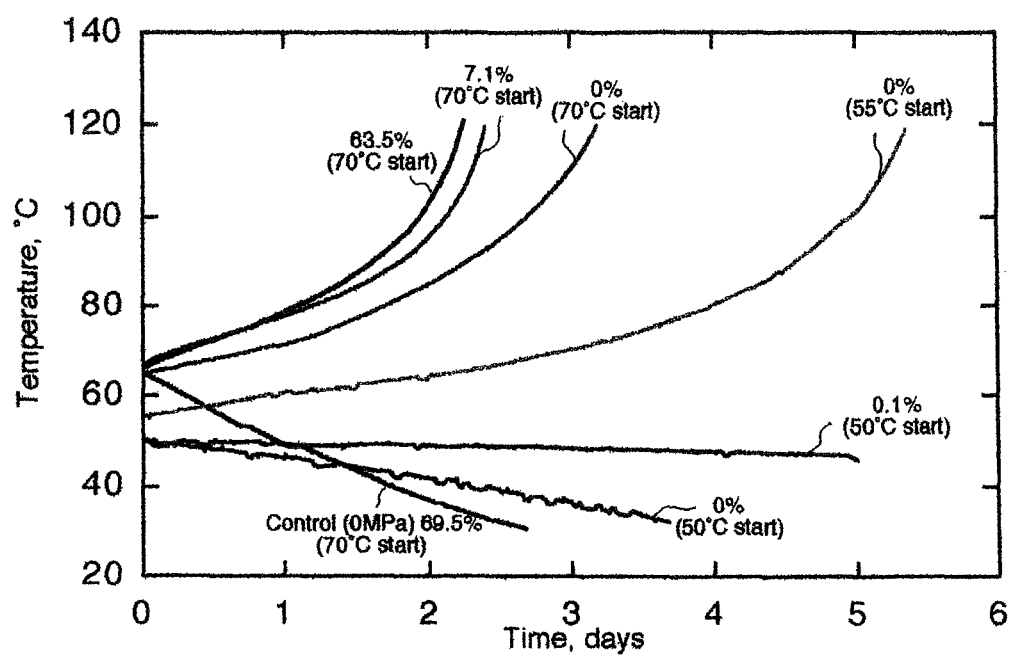
FIG. 8 is a graph showing temperature changes for the slightly high pressure reaction after heating dried cow excreta to approximately 50° C. to approximately 70° C.
Figure 9:
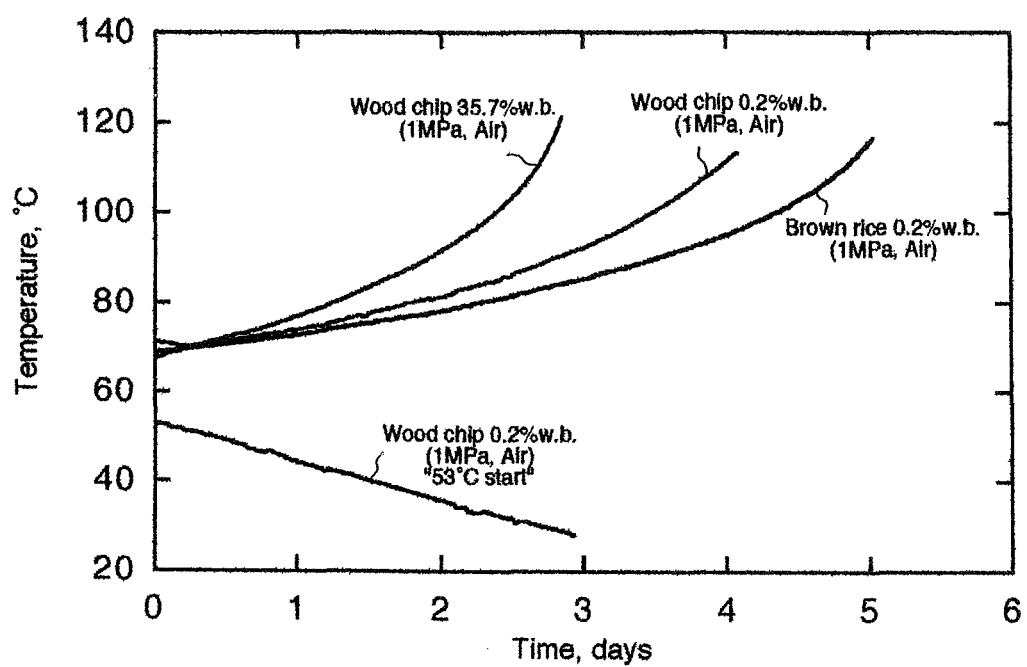
FIG. 9 is a graph showing temperature changes for the slightly high pressure reaction of dry-type biomass (wood chips and brown rice), excluding the cow excreta.

1 High pressure tank
2 Container
3 Gas injection tube
4 First valve
5 Gas exhaust tube
6 Second valve
7 Heat insulating chamber
A Slightly high pressure reaction
B Pressureless reaction (composting and sealing reactor)
C Sealing reactor (composting)

The invention claimed is:

1. A method comprising:
a first reaction stage including:
placing an organic waste in an air-compressible hermetic container having a pipe and a valve;
forcedly supplying oxygen inside the organic waste under a compressed-air environment over an atmospheric pressure and equal to or less than 15MPa;
increasing an internal temperature of the organic waste, into which the oxygen is supplied, to at least 55° C. by an organics degradation reaction of microorganism existing in the organic waste; and
increasing carbon monoxide levels in the hermetic container to at least 100 ppm by the organics degradation reaction of microorganism existing in the organic waste; and
a second reaction stage including holding the organic waste, that has increased to at least 55° C. or greater by the first reaction stage, in the presence of the oxygen and carbon monoxide equal to or greater than 100 ppm originated from the organic waste after the first reaction stage in the hermetic container, to cause an exothermic reaction to increase the temperature of the organic waste,
wherein the organic waste is selected from the group consisting of: (1) livestock excreta having a water content ratio of 80% or greater, (2) an agricultural waste product having a water content ratio of 80% or greater, and (3) a food waste product having a water content ratio of 40% or greater.

2. A method comprising:

a first reaction stage including:
- placing an organic waste in an air-compressible hermetic container having a pipe and a valve;
- directly injecting oxygen inside the organic waste using a tube,
- increasing an internal temperature of the organic waste, into which the oxygen is supplied, to at least 55° C. by an organics degradation reaction of microorganism existing in the organic waste; and
- increasing carbon monoxide levels in the hermetic container to at least 100 ppm by the organics degradation reaction of microorganism existing in the organic waste; and a second reaction stage including holding the organic waste, that has increased to at least 55° C. or greater by the first reaction stage, in the presence of the oxygen and carbon monoxide equal to or greater than 100 ppm originated from the organic waste after the first reaction stage in the hermetic container, to cause an exothermic reaction to increase the temperature of the organic waste, wherein the organic waste is selected from the group consisting of: (1) livestock excreta having a water content ratio of 80% or greater, (2) an agricultural waste product having a water content ratio of 80% or greater, and (3) a food waste product having a water content ratio of 40% or greater.

* * * * *